United States Patent [19]

Rohmann et al.

[11] 3,957,710

[45] May 18, 1976

[54] PAPER COATING COMPOSITIONS FROM POLYMERS OF OLEFINICALLY UNSATURATED MONOMERS

[75] Inventors: Michael Ernst Rohmann, Bad Duerkheim; Kurt Wendel, Ludwigshafen, both of Germany

[73] Assignee: BASF Aktiengesellschaft, Ludwigshafen (Rhine), Germany

[22] Filed: Sept. 18, 1974

[21] Appl. No.: 507,368

Related U.S. Application Data

[63] Continuation of Ser. No. 353,620, April 23, 1973, abandoned.

[30] Foreign Application Priority Data

Apr. 26, 1972 Germany............................ 2220443

[52] U.S. Cl................. 260/29.6 TA; 260/29.6 HN; 260/29.7 T; 260/42.55; 427/391; 427/411; 428/511; 526/258; 526/304; 526/317; 526/320; 526/328; 526/346
[51] Int. Cl.²...................... C09D 5/02; C09D 3/80; C08L 39/04; C08L 35/00
[58] Field of Search................ 260/29.6 T, 29.6 TA, 260/80.3 N, 80.73, 78.5 R, 80.8; 117/155 UA

[56] References Cited
UNITED STATES PATENTS

| 3,043,822 | 7/1962 | Maeder..................... 260/80.3 N X |
|---|---|---|
| 3,048,501 | 8/1962 | Miller et al.................. 260/80.73 X |
| 3,050,486 | 8/1962 | Ritson et al.................. 260/80.73 X |
| 3,078,185 | 2/1963 | Kine et al..................... 260/29.6 TA |
| 3,081,198 | 3/1963 | Miller........................ 260/29.6 TA X |
| 3,404,114 | 10/1968 | Snyder et al. ................ 260/29.6 TA |
| 3,634,298 | 1/1972 | Wamsley et al............. 260/29.6 TA |
| 3,671,472 | 6/1972 | McNamee et al............ 260/17.4 ST |
| 3,770,846 | 11/1973 | Stuber et al.................... 260/78.5 R |

*Primary Examiner*—Lucille M. Phynes
*Attorney, Agent, or Firm*—Johnston, Keil, Thompson & Shurtleff

[57] ABSTRACT

Paper coating compositions with finely divided pigment, optical brightener and a binder containing a copolymer of from 5 to 30% by weight of mono-olefinically unsaturated carboxylic acids, from 5 to 30% by weight of mono-olefinically unsaturated monomers containing basic nitrogen atoms and from 50 to 80% by weight of other olefinically unsaturated monomers which, when polymerized alone, give water-insoluble homopolymers and cause virtually no reduction in the effect of conventional optical brighteners even in the absence of casein or carboxymethyl cellulose.

4 Claims, No Drawings

PAPER COATING COMPOSITIONS FROM POLYMERS OF OLEFINICALLY UNSATURATED MONOMERS

RELATED APPLICATION

This application is a continuation of our copending application Ser. No. 353,620, filed Apr. 23, 1973, now abandoned.

This invention relates to paper coating compositions and in particular to the type of synthetic binders contained therein.

Although these binders are contained in paper coating compositions in minor quantities, usually in amounts of from 5 to 30% by weight based on the pigment, they are an important factor determining the processing properties of the coating compositions and the quality of the coated papers. The high operating rates of modern high-output coating processes used in the paper industry demand that the coating compositions have a high solids content to ensure that the drying capacity of the plant is adequate. However, the paper coating compositions should have very good flow properties and be resistant to mechanical stresses such as shear stresses and they should also exhibit good pigment-binding properties when applied. Moreover, the coated papers should, in many cases, show maximum whiteness.

It has been known for many years to use aqueous dispersions of acrylate copolymers as synthetic binders either alone or together with natural binders such as starch, casein and soy protein. U.S. Pat. No. 3,081,198 and Belgian Pat. No. 655,981 also disclose the use of mixtures of acrylate and vinyl ester copolymers with acrylic acid/acrylate copolymers as synthetic binders in paper coating compositions. The use of carboxyl-containing butadiene/styrene copolymers as binders in paper coating compositions is revealed, for example, in U.K. Pat. No. 873,876. U.S. Pat. No. 2,873,066 describes the use of copolymers of acrylates and amides of $\alpha,\beta$-olefinically unsaturated carboxylic acids such as acrylic acid, methacrylic acid and itaconic acid, as binders in paper coating compositions. Finally, U.S. Pat. No. 3,048,501 discloses the use of copolymers of from 60 to 84% of lower acrylates, from 6 to 10% of $\alpha,\beta$-olefinically unsaturated monocarboxylic acids such as acrylic and methacrylic acids and from 6 to 30% of amides of such carboxylic acids as components in paper coating compositions which also contain conventional binders based on polyacrylates or butadiene/styrene copolymers and also natural binders such as casein, soy protein and starch.

Paper coating compositions containing such conventional binders usually exhibit good flow properties and are resistant to mechanical stresses and they also usually show good pigment-binding properties when applied, but they suffer from the drawback that when conventional optical brighteners such as stilbene derivatives are used, they distinctly impair the brightening effect of said brighteners unless casein or carboxymethyl cellulose are also included in addition to said synthetic binders. It is an object of the present invention to provide binders for paper coating compositions which do not suffer from the said disadvantage.

We have now found that paper coating composition binders based on carboxyl-containing copolymers of olefinically unsaturated monomers cause virtually no reduction of the brighteners effect of conventional optical brighteners if said binders contain a copolymer of from 5 to 30% by weight of mono-olefinically unsaturated carboxylic acids, from 5 to 30% by weight of mono-olefinically unsaturated monomers containing basic nitrogen atoms and from 50 to 80% by weight of other olefinically unsaturated monomers which, when polymerized alone, give water-insoluble homopolymers. Our novel synthetic binders may be used in paper coating compositions either alone or together with other natural or synthetic binders. They are contained in the paper coating compositions in general in amounts of from 2 to 25 and preferably from 2 to 15 and more preferably from 3 to 12 parts by weight of copolymer per 100 parts of finely divided pigment. If other natural or synthetic binders are also used, it will in general be sufficient to use quantities of from 1 to 10 and in particular from 2 to 5 parts by weight of our novel binder copolymers. In this case, the total amount of binder should generally be between 6 and 30 and preferably between 7 and 25 partly by weight per 100 parts of pigment.

Our novel binders for paper coating compositions, which are generally used in the form of aqueous dispersions having a solids content of from 30 to 60% and in particular of from 30 to 50%, contain from 5 to 30% and preferably from 10 to 20% by weight, based on copolymer, of units of mono-olefinically unsaturated carboxylic acids and in particular of mono- and/or di-carboxylic acids which contain preferably from 3 to 5 carbon atoms and are $\alpha,\beta$-olefinically unsaturated, e.g., acrylic acid, methacrylic acid, crotonic acid, maleic acid, itaconic acid and fumaric acid. Suitable mono-olefinically unsaturated monocarboxylic acids are also half-esters, i.e., monoalkyl esters, of dicarboxylic acids such as the monomethyl, monoethyl and mono-n-butyl esters of maleic, fumaric and itaconic acids. Such monoalkyl esters contain a total of from 5 to 9 carbon atoms and are derived from $C_{4-5}$ $\alpha,\beta$-mono-olefinically unsaturated dicarboxylic acids and $C_{1-4}$ alkanols, which are usually linear.

The copolymers also contain from 5 to 30% and preferably from 5 to 15% by weight of polymerized units of mono-olefinically unsaturated monomers containing basic nitrogen atoms. Among suitable monomers having basic nitrogen atoms those of the general formula I:

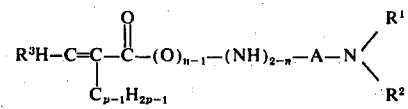

in which A denotes a divalent hydrocarbon radical of from 2 to 6 carbon atoms, $R^1$ and $R^2$ each individually denote hydrogen or a substituted or unsubstituted hydrocarbon radical of from 1 to 6 carbon atoms or $R^1$ and $R^2$ form, together with the nitrogen atom, a hetrocyclic ring, $R^3$ denotes hydrogen or methyl and n and p each denote 1 or 2, are of particular interest. The olefinically unsaturated monomers of the general formula I are preferably amides of esters of acrylic, methacrylic and crotonic acids, i.e., of $C_{3-4}$ $\alpha,\beta$-mono-olefinically unsaturated carboxylic acids. The hydrocarbon radical A contained therein is preferably an alkylene radical of from 2 to 6 carbon atoms, which may be branched-chain or, preferably, straight-chain. Particularly important radicals as hydrocarbon radicals A are the ethylene, n-propylene and n-butylene radicals. Also suitable are cyclic hydrocarbon radicals of 6 carbon atoms, for example the phenylene-1,4 and cyclohexylene-1,4 radicals.

The groups $R^1$ and $R^2$ attached to the basic nitrogen atom may be the same or different. Particularly interesting substituents $R^1$ and $R^2$ are $C_{1-4}$ branched or, preferably, unbranchend alkyl radicals. These may also be substituted by, say, nitrile, hydroxyl or methoxy groups. The radicals $R^1$ and $R^2$ may, together with the basic nitrogen atom, form a heterocyclic ring, e.g., form part of a morpholine, pyrrolidone, piperdine or piperazine ring. Olefinically unsaturated monomers having basic nitrogen atoms of the general formula I preferably do not contain more than 1 hydrogen atom attached to the basic nitrogen atom.

Suitable monomers of the general formula I are, for example, N-$\beta$-dimethylaminoethyl acrylamide, N-$\beta$-dimethylaminoethyl methacrylamide, N-4-dimethylaminophenyl acrylamide, N-$\gamma$-di($\beta$-hydroxyethyl)amino-n-propyl acrylamide and the corresponding methacrylamide, acrylic and methacrylic $\beta$-pyrrolidone-ethylamides, acrylic and methacrylic $\beta$-morpholino-ethylamides, N-$\beta$-diethylaminoethyl acrylamide and the corresponding methacrylamide, N-$\gamma$-dimethylaminopropyl acrylamide and the corresponding methacrylamide, N-4-dimethylaminocyclohexyl acrylamide and the corresponding methacrylamide, ethyl $\beta$-diethylaminoacrylate and the corresponding methacrylate, n-propyl $\gamma$-diethylaminoacrylate and the corresponding methacrylate, n-propyl $\gamma$-di-n-butylaminoacrylate and the corresponding methacrylate, propyl $\gamma$-di(2-cyanoethyl)aminoacrylate and the corresponding methacrylate, n-propyl $\gamma$-diphenylaminoacrylate, (4-diethylaminophenyl) methacrylate, N-methylaminoethyl acrylamide and the corresponding methacrylamide, N-n-butylaminobutyl acrylate and the corresponding methacrylate, $\beta$-aminoethyl acrylamide, $\beta$-aminoethyl methacrylamide, ethyl $\beta$-aminoacrylate and ethyl $\beta$-aminomethacrylate.

Particularly important olefinically unsaturated monomers having basic nitrogen atoms are alkyl N-dialkylaminoacrylates and the corresponding methacrylates and N-(dialkylaminoalkyl) acrylamides and the corresponding methacrylamides.

Suitable other olefinically unsaturated monomers which may be included in the copolymers in amounts of from 50 to 80% and preferably from 60 to 70% by weight, based on the copolymer, are, in particular, olefinically unsaturated carboxylates, vinylaromatic monomers and 1,3-diolefins. Suitable mono-olefinically unsaturated carboxylates generally contain from 4 to 22 in particular from 4 to 12 and preferably from 4 to 8 carbon atoms. Particularly suitable esters are those of $\alpha,\beta$-mono-olefinically unsaturated mono- and di-carboxylic acids preferably containing from 3 to 5 carbon atoms with aliphatic monoalcohols, preferably containing from 1 to 8 and more preferably from 2 to 4 carbon atoms, particularly branched-chain alkanols and preferably straight-chain alkanols, such as in particular methyl acrylate, methyl methacrylate, ethyl acrylate, n-propyl methacrylate, n-butyl acrylate, isopropyl acrylate, 2-ethylhexyl acrylate, 2-ethylhexyl methacrylate, di-n-butyl maleate, methyl crotonate, diethyl maleate and n-decyl acrylate.

Other suitable mono-olefinically unsaturated carboxylates are vinyl esters usually of $C_{2-18}$ and in particular of $C_{2-12}$ saturated straight-chain or branche-chain aliphatic carboxylic acids, in particular vinyl acetate, vinyl propionate, vinyl n-butyrate, vinyl laurate and vinyl stearate.

Particularly suitable monovinylaromatic monomers are styrene and also $\alpha$-methylstyrene and vinyl toleunes. A particularly interesting 1,3-diolefin is butadiene, but other 1,3-diolefins preferably containing 4 or 5 carbon atoms, such as isoprene and chloroprene, are also suitable. Finally, other suitable olefinically unsaturated compounds of the types which may be included in minor quantities of from 0 to, say 15% by weight are acrylonitrile and methacrylonitrile and, in smaller quantities of from 0 to, say, 7% by weight, amides of $\alpha,\beta$-mono-olefinically unsaturated mono- and di-carboxylic acids preferably of from 3 to 5 carbon atoms, such as, in particular, acrylamide and methacrylamide, and their N-methylol and N-alkoxy-methyl derivatives in which the alkoxy groups preferably contain from 1 to 4 carbon atoms. Copolymers suitable for use as binders in paper coating compositions contain for example from 50 to 80% of their weight of a mixture consisting of from 30 to 55% by weight of butadiene and from 70 to 45% by weight of acrylonitrile and/or, in particular, styrene, as polymerized units. Also of interest are copolymers which contain from 50 to 80% of their weight of a mixture consisting of from 10 to 40% by weight of butadiene, from 10 to 40% by weight of styrene and/or acrylonitrile and from 10 to 40% by weight of an acrylate and/or methacrylate of a $C_{1-8}$ and in particular $C_{2-4}$ alkanol, as polymerized units. Other copolymers suitable for use as binders in paper coating compositions are those which contain from 50 to 80% of their weight of a mixture consisting of from 40 to 60% by weight of acrylates and/or methacrylates of $C_{1-8}$ and in particular $C_{2-4}$ straight-chain or branched-chain alkanols and from 40 to 60% by weight of styrene and/or acrylonitrile, as polymerized units. Finally, other copolymers suitable as binders in paper coating compositions which are of particular interest are those containing from 50 to 80% of their weight of a mixture consisting of from 50 to 100% by weight of vinyl acetate, from 0 to 50% by weight of an acrylate or methacrylate of a $C_{1-8}$ and in particular $C_{1-4}$ straight-chain or branched-chain alkanol and from 0 to 30% by weight of vinyl laurate and/or acrylonitrile, as polymerized units.

The binder copolymers may be prepared from the said monomers in conventional manner, particularly by polymerization in aqueous emulsion using conventional emulsifiers, dispersing agents and polymerization catalysts, for example by the method described in German published application No. 1,720,439. The aqueous dispersions of the copolymers may contain emulsifiers and protective colloids such as are described in detail in Houben-Weyl "Methoden der organischen Chemie" Vol. XIV/1, "Makromolekulare Stoffe," published by Georg Thieme Verlag, Stuttgart (1961), pp. 192–208 and 411–420, anionic and non-ionic emulsifiers being preferred. This literature is incorporated herein by reference.

Aqueous dispersions of copolymers of the kind described above are eminently suitable for use as binders in the manufacture of paper coating compositions. Before application, they may be mixed in known manner with fillers, particularly kaolin, and if desired with other auxiliaries and neutralized by the addition of alkali such as caustic soda, caustic potash or, preferably, ammonia or they may be added to the coating composition in the form of neutralized solutions. They are preferably used as binders for paper coating compositions also containing conventional optical brighteners, e.g. those based on stilbene derivatives. Such optical brighteners are generally added to the paper coating compositions in amounts of from 0.1 to 2.0% and in particular from 0.2 to 1.5%, by weight of the total paper coating composition. Paper coating compositions containing the binders of the invention and also conventional optical brighteners give coated papers showing a whiteness (as measured by the Tappi Standard Method T 452 m-58) which is better than that of coated papers produced using paper coating compositions containing only conventional synthetic binders but not casein, carboxymethyl cellulose or polyvinyl alcohol. The whiteness of coated papers or cards prepared with the use of paper coating compositions containing the binders of the invention is just as good as that of papers coated with paper coating compositions containing casein and conventional synthetic binders. However, the binders of the invention are superior to casein as a natural binder in paper sizing compositions for the following reasons: they are anti-bacterial, are easier to handle, are more soluble and the quality obtained is constant.

The paper coating composition viscosities given in the following Examples were measured with a Brookfield Rotational Viscosmeter HVL at 20°C using spindle No. 4 at a speed of 100 r.p.m. The water retentions given in the Examples were determined as follows. The coating composition was dyed with Fast Acid Violet and the covered with a filter paper (Blauband paper manufactured by Schleicher & Schull) and the drop in reflectance of this paper was measured with suitable measuring apparatus (Elrepho Type G 50-660 manufactured by Carl Zeiss). The measure of water retention of the coating composition was taken to be the time taken for the reflectance to fall to 40%.

In the following Examples, coated papers are prepared by applying the coating composition to a wood-free body paper at a rate of 12 g/m$^2$ (dry weight) by means of metering bar, whereupon the paper was dried in a drying cabinet at 105°C for 30 seconds and then calendered in conventional manner. The coated papers were then tested for the following properties:

1. Whiteness, measured with a reflectance apparatus (Elrepho Type G 50-660 made by Carl Zeiss, using a xenon lamp with and without UV filters), the results being given as a percentage of a magnesium oxide whiteness standard.
2. Gloss, measured with a goniophotometer made by Carl Zeiss, the results being given in %.
3. Pick resistance, measured with an IGT printability tester Type AC-2.
4. Ink receptivity, determined in conventional manner after inking for 2 minutes with a K and N test ink.
5. Patra oil adsorption measured in the usual manner and given in seconds.

In the following Examples, the kaolin used in the coating compositions is that provided by English China Clays, Lovering and Pochin Ltd., under the name Dinki A, and the conventional optical brightener used in Blacophor P made by Farbenfabriken Bayer AG, Leverkusen (Blancophor is a registered trade mark).

In the following Examples the parts and percentages are by weight.

EXAMPLE 1

30 g Of hexametaphosphate and 20 g of sodium hydroxide are dissolved in 4,700 g of water in a commercial dispersing apparatus. There are then added 10,000 g of kaolin with stirring and the mixture is homogenized for 20 minutes at 30,000 r.p.m. There are then added 330 g of a 50% aqueous dispersion containing a copolymer A and a copolymer B of Example 1 of German Published application No. 1,696,163 and 75 g of a 10% aqueous solution of an optical brightener (premix of coating composition).

a. To 860 parts of the above premix there is added a solution obtained from 66.2 g of a 30% aqueous dispersion of a copolymer of 280 parts of ethyl acrylate, 80 parts of acrylic acid and 40 parts of N-dimethylaminoethyl acrylate (added as the hydrochloride) and containing, as emulsifier, n-octylphenol alkoxylated with 25 moles of ethylene oxide, by mixing with 100 g of water and adding caustic soda solution until a pH of 8.5 is obtained. Raw stock is then coated with this coating composition A. The pH, viscosity and water retention of the coating composition as well as its whiteness, gloss, pick resistance, ink receptivity and Patra oil adsorption are given in Table 1 below under "Composition A."

b. For purposes of comparison, there are added to 860 g of said premix 100 g of a 20% aqueous casein solution obtained by allowing 100 g of casein to swell in 400 g of water and adding 5.5% (based on solid casein) of caustic soda followed by heating to 50°C with stirring. Before the casein solution is added, the premix is diluted with water to such an extent that the total solids content of the resulting coating composition is 53%. Raw stock is then coated with the resulting coating composition B. The pH, viscosity and water retention of the composition B and the whiteness, gloss, pick resistance, ink receptivity and Patra oil adsorption of the paper coated with said composition B are given in Table 1 below under "Composition B."

c. To 860 g of said premix there are added 66.8 g of a conventionally prepared 30% aqueous dispersion of a copolymer of 320 parts of ethyl acrylate and 80 parts of acrylic acid, whereupon water is added so as to give a final total solids content of 53%. The resulting coating composition C is applied to raw stock. The pH, viscosity and water retention of the coating composition C and the whiteness, gloss, pick resistance, ink receptivity and Patra oil adsorption of the paper coated therewith are given in Table 1 below under "Composition C."

TABLE 1

|  | Coating composition | | |
|---|---|---|---|
|  | A | B | C |
| pH | 9.1 | 10.35 | 9.15 |
| viscosity (centipoises) 100 r.p.m. | 633 | 384 | 756 |
| water retention (sec.) | 129 | 156 | 129 |
| whiteness with filter | 85.7 | 85.5 | 85.4 |
| without filter | 88.7 | 88.6 | 87.9 |
| gloss | 4.72 | 4.86 | 5.02 |
| pick resistance (cm/sec) | 117 | 98 | 116 |
| ink receptivity (%) | 29.3 | 29.5 | 30.5 |
| Patra oil adsorption (sec) | 141 | 164 | 135 |

EXAMPLE 2

A coating composition is prepared in conventional manner so as to contain, per 100 parts of kaolin, 0.03 part of sodium polyacrylate, 0.1 part of sodium hydroxide, 0.5 part of a commercial optical brightener and 11 parts of a 50% aqueous dispersion (mixture of copolymer A and copolymer B) of Example 1 German published application No. 1,696,163. To this mixture there is added (a) 4 parts of a conventionally prepared 31% aqueous dispersion of a copolymer of 350 parts of ethyl acrylate, 100 parts of methacrylic acid and 50 parts of N-dimethylaminoethyl methacrylate (added as the hydrochloride) and containing, as emulsifier, the sodium salt of sulfonated n-octylphenol ethoxylated with 25 moles of ethylene oxide, or (b) 4 parts of casein. The pH, viscosity and water retention of the resulting coating compositions (a) and (b) and the whiteness, gloss, pick resistance, ink receptivity and Patra oil adsorption of the papers coated therewith are given in Table 2 below.

TABLE 2

| | Composition (a) | Composition (b) |
|---|---|---|
| pH | 9.0 | 9.33 |
| viscosity (centipoises) 100 r.p.m. | 3900 | 4660 |
| water retention (sec.) | 105 | 135 |
| whiteness with filter | 85.0 | 84.7 |
| without filter | 90.1 | 89.2 |
| gloss (%) | 6.4 | 7.6 |
| pick resistance (cm/sec) | 84 | 70 |
| ink receptivity | 26.2 | 27.2 |
| Patra oil adsorption (sec) | 195 | 225 |

Comparison of the results obtained for composition (a) with those obtained for composition (b) shows that the coating composition of the invention gives an improved optical brightening effect and improved pick resistance over the casein-containing coating composition.

EXAMPLE 3

A 68% kaolin slurry is prepared from 100 parts of kaolin, 0.3 part of sodium polyacrylate and 0.1 part of caustic soda solution, and to this there is added 0.5 part (based on the weight of kaolin) of optical brightener (Blanccophor BPN of Farbenfabriken Bayer AG, Leverkusen).

a. To 1,470 g of the resulting mixture there is added a solution obtained from a mixture (adjusted to pH 9.5) of 333 g of a conventionally prepared 30% aqueous dispersion of a copolymer of 210 parts of ethyl acrylate, 60 parts of acrylic acid and 30 parts of N-methyl-N'-hydroxyethylpiperazine acrylate (added as the hydrochloride), containing the sodium salt of the sulfonated reaction product of n-octylphenyl with 25 moles of ethylene oxide, as emulsifier, and 397 g of water.

b. to 1,770 g of said kaolin slurry there are added 230 g of water followed by 500 g of a 20% casein solution, the pH then being adjusted to about 10.5. The solids content of the coating composition (b) is 50%. The pH, viscosity and water retention of the coating compositions (a) and (b) and the whiteness, gloss, pick resistance, ink receptivity and Patra oil adsorption of the papers coated with said compositions (a) and (b) are given in Table 3 below.

TABLE 3

| | Composition (a) | Composition (b) |
|---|---|---|
| pH | 9.0 | 10.58 |
| viscosity (centipoises) 120 r.p.m. | 3080 | 652 |
| water retention (sec.) | 425 | 660 |
| whiteness with filter | 85.2 | 84.8 |
| without filter | 90.2 | 90.3 |
| gloss (%) | 4.5 | 6.2 |
| pick resistance (cm/sec) | 47 | 44 |
| ink receptivity (%) | 33.1 | 19.9 |
| Patra oil adsorption (sec) | 75 | 132 |

Comparison of the results obtained for coating composition (a) with those obtained for coating composition (b) shows that the paper coated with the composition of the invention exhibits improved whiteness and also somewhat better pick resistance.

We claim:

1. A paper coating composition comprising a finely divided pigment, and 2–25 parts by weight, per 100 parts by weight of said finely divided pigment, of a synthetic polymer binder composition containing, in aqueous dispersion, from 30 to 60% by weight based on the dispersion, of a copolymer consisting of (a) from 5 to 30% by weight of mono-olefinically unsaturated carboxylic acids selected from the group consisting of $C_{3-5}$ mono- and di-carboxylic acids and $C_{5-9}$ monoalkyl esters of $C_{4-5}$ dicarboxylic acids, (b) from 5 to 30% by weight of monomers of the general formula:

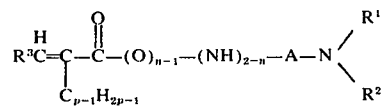

in which A is a $C_{2-6}$ hydrocarbon radical, $R^1$ and $R^2$ are each individually hydrogen atoms or $C_{1-6}$ hydrocarbon radicals or $R^1$ and $R^2$ form, together with the N atom, a heterocyclic ring, $R^3$ is hydrogen or methyl and n and p are each 1 to 2, and (c) from 50 to 80% by weight of monomers selected from the group consisting of $C_{4-8}$ mono-olefinically unsaturated carboxylates and styrene.

2. A paper coating composition as claimed in claim 1 wherein said binder is, in aqueous dispersion, a copolymer consisting of 5–30% by weight of acrylic acid, 5–30% by weight of N-dimethylaminoethyl acrylate, and 50–80% of ethyl acrylate.

3. A paper coating composition as claimed in claim 1, wherein n is 1; p is 1 or 2; A is an akylene group of 2–6 carbon atoms; and $R^1$ and $R^2$ are alkyl with 1–4 carbon atoms.

4. A paper coating composition comprising a finely divided pigment, 0.1 to 2.0% by weight of an optical brightener which is a stilbene derivative, and 2–25 parts by weight, per 100 parts by weight of said finely divided pigment, of a synthetic polymer binder composition containing, in aqueous dispersion, from 30 to 60% by weight based on the dispersion, of a copolymer consisting of (a) from 5 to 30% by weight of mono-olefinically unsaturated carboxylic acids selected from the group consisting of $C_{3-5}$ mono- and di-carboxylic acids and $C_{5-9}$ monoalkyl esters of $C_{4-5}$ dicarboxylic acids, (b) from 5 to 30% by weight of monomers of the general formula:

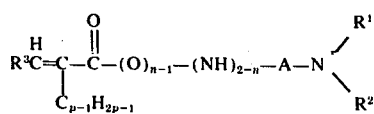
in which A is a $C_{2-6}$ alkylene group, $R^1$ and $R^2$ is each individually hydrogen or a $C_{1-6}$ alkyl group, $R_3$ is hydrogen or methyl and $n$ and $p$ are each 1 or 2, (c) from 50 to 80% by weight of monomers selected from the group consisting of $C_{4-8}$ mono-olefinically unsaturated carboxylates and styrene.
* * * * *